United States Patent [19]

Allcock

[11] Patent Number: 4,817,108
[45] Date of Patent: Mar. 28, 1989

[54] GAS DISCHARGE STRUCTURE FOR AN R.F. EXCITED GAS LASER

[75] Inventor: Geoffrey Allcock, Hull, England

[73] Assignee: Coherent, Inc., Palo Alto, Calif.

[21] Appl. No.: 169,289

[22] Filed: Mar. 17, 1988

[30] Foreign Application Priority Data

Mar. 17, 1987 [GB] United Kingdom ............... 8706305

[51] Int. Cl.$^4$ ............................................. H01S 3/097
[52] U.S. Cl. ...................................... 372/82; 372/35; 372/87
[58] Field of Search ................. 372/35, 61, 64, 82, 372/87, 88, 55, 83

[56] References Cited

U.S. PATENT DOCUMENTS

| 4,730,332 | 3/1988 | Hoag ..................... 372/87 |
| 4,730,333 | 3/1988 | Butenuth ............... 372/87 |
| 4,752,935 | 6/1988 | Beck ..................... 372/88 |

Primary Examiner—Leon Scott, Jr.
Attorney, Agent, or Firm—Limbach, Limbach & Sutton

[57] ABSTRACT

A gas discharge structure for an R.F. discharge excited gas laser comprising an R.F. electrode (1), a ground electrode (2) and a metal coolant carrying pipe (4) carried bie said R.F. electrode. The pipe (4) is connected at each end to coolant source or drain at ground potential. The coolant carrying pipe (4) is inductively decoupled at each end from ground potential and has a wall thickness many times greater than the "R.F. skin depth" at the R.F. frequency of operation.

16 Claims, 2 Drawing Sheets

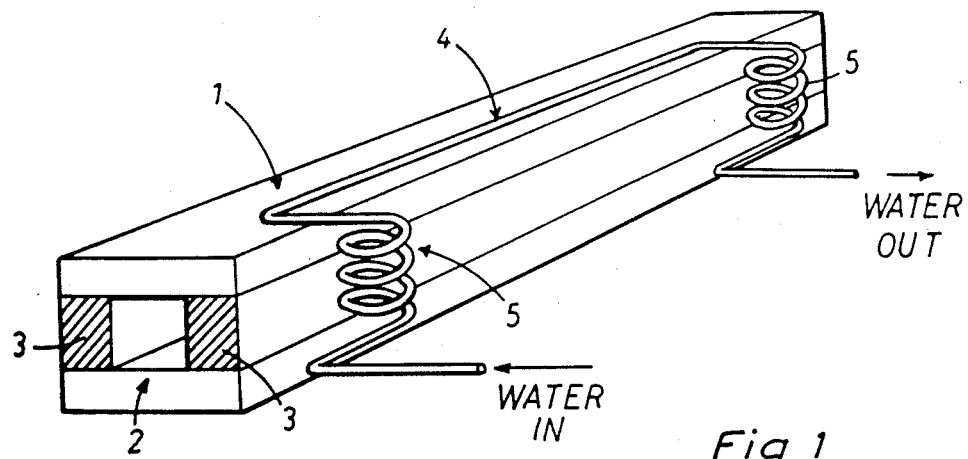
Fig_1
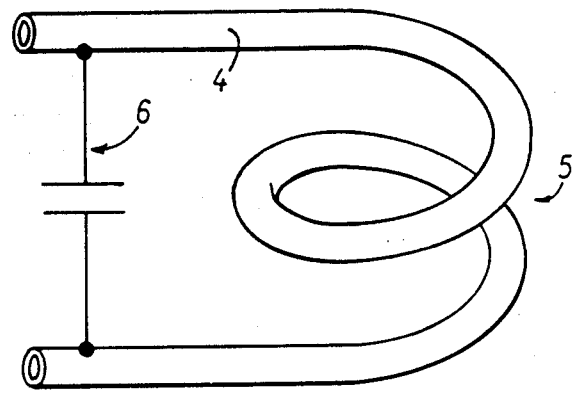
Fig_2
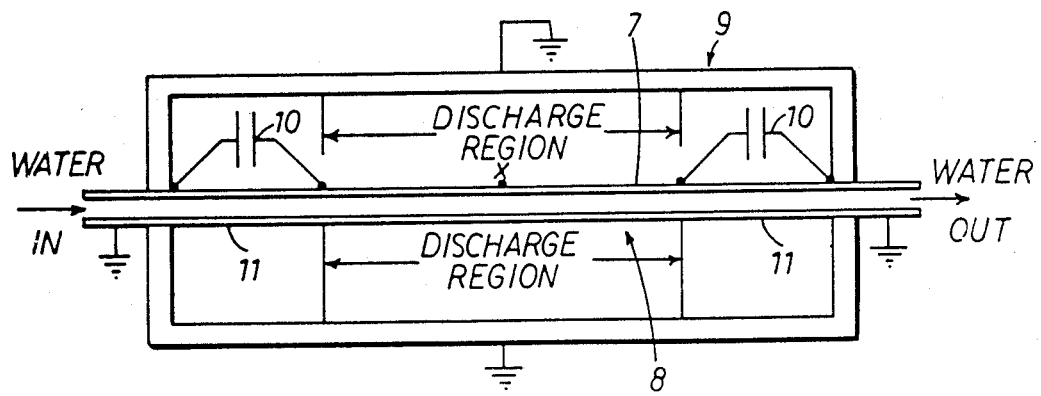
Fig_3

GAS DISCHARGE STRUCTURE FOR AN R.F. EXCITED GAS LASER

The present invention relates to R.F. discharge excited gas lasers and in particular to a gas discharge structure for exciting the gas discharge.

R.F. discharges have been used for the excitation of gas lasers since the earliest days of laser research. In 1971 a transverse R.F. field was used to excite a high power carbon dioxide laser in a rectangular multipass laser cavity (Clyde Brown and Jack Davis Appl Phys Lett 21 480 (1972)). Conventionally the gas discharge is excited by means of a structure comprising two metal electrodes separated by a dielectric material such as ceramic. One electrode is held at ground potential and an R.F. signal is applied to the other. In this way the gas discharge is confined to the space between the two electrodes.

It will be readily apparent that the impedance of such a gas discharge structure can be represented by a capacitor, due to the natural capacitance of two electrodes separated by a dielectric material, in parallel with a resistance, due to the gas discharge between the two electrodes, and is given by:

$$Z = \frac{R}{W^2 C^2 R^2 + 1} - j \frac{WCR^2}{W^2 C^2 R^2 + 1}$$

where W is the angular frequency of the R.F. signal, C is the natural capacitance of the gas discharge structure and R is the resistance of the gas discharge. The presence of the $(-j)$ term indicates that the impedance includes a capacitative component.

In the prior art it is known to modify the capacitative component of the gas discharge structure by connecting external inductors in parallel with the structure. These may be localized at preferred points along the gas discharge structure or uniformly distributed. The effect of this is to both modify the input impedance of the structure to facilitate impedance matching with the R.F. signal generator, and to locally modify the voltage distribution along the "live" or R.F. electrode.

A major problem with this kind of conventional gas discharge structure is the efficient and uniform removal of heat from the gas discharge. Indeed, for high power lasers the problem is such that air cooling of the gas discharge structure becomes quite inadequate and some form of liquid cooling is required. Water cooling is cheap and there is no need to re-cycle it as is the case with more expensive coolants. Water cooling of the ground electrode is a straight forward and established technique which involves flowing water through the ground electrode. On the other hand the R.F. electrode has been cooled by heat conduction through the dielectric material separating the two.

Unfortunately, this technique is very inefficient for low capacitance gas discharge structures in which the area of overlap between the electrodes and the dielectric material is reduced. The temperature of the R.F. electrode becomes greater than that of the ground electrode, and this leads to a non-uniform temperature distribution across the gas discharge. Direct water cooling of the R.F. electrode improves the uniformity but still presents a problem. Here the water must flow from ground potential to the R.F. electrode and back again to ground without shorting out the electrode or introducing resistive losses to the circuit.

The use of metal water pipes with insulated (i.e., plastic) sections through which the water flows to and from the R.F. electrode is known, but this is only a partial solution. These capacitatively de-couple the R.F. electrode from ground, but the presence of water within the insulated sections represents a lossy dielectric at R.F. and results in a reduction of the overall Q of the R.F. circuit.

It is an object of the present invention to provide a gas discharge structure for an R.F. discharge excited gas laser in which uniform cooling of both the R.F. electrode and the ground electrode is achieved.

According to a first aspect of the present invention there is provided a gas discharge structure for an R.F. discharge excited gas laser comprising an R.F. electrode, a ground electrode and a means for cooling the R.F. electrode. The cooling means includes a metal coolant carrying pipe connected at each end to a coolant source or drain at ground potential. In accordance with the subject invention, the coolant carrying pipe is inductively decoupled at each end from ground potential. The pipe is provided with a wall thickness many times greater than the "R.F. skin depth" at the R.F. frequency of operation.

In the first embodiment, the coolant carrying pipe is secured to the surface of the electrode in thermal contact therewith. In an alternative embodiment, the radially outer center section of the coolant carrying pipe defines the R.F. electrode.

The sections of the coolant carrying pipe between the center and the ends define inductive elements, the impedance of which is such that at the R.F. frequency of operation, the center portion is decoupled from ground potential. The inductive element may comprise one or more coils wound in the coolant carrying pipe itself, or a straight section of the pipe if this has sufficient inductance.

In an alternate embodiment of the first aspect of the present invention, the R.F. discharge excited gas laser comprises an outer tubular ground electrode and a radially inner, coaxially aligned metal coolant carrying pipe which is connected to and supported by the ground electrode at each end. The radially outer portion of the center section of the coolant carrying pipe defines the R.F. electrode. The sections of the pipe between the center section and the ends define inductive elements which inductively decouple the R.F. electrode from the ground electrode.

Conveniently, the tubular ground electrode and the metal coolant carrying pipe define an annular discharge but the technique is equally applicable to other configurations and geometries.

Preferably, a capacitor is connected in parallel with each inductive section of the coolant carrying pipe and is tuned to parallel resonance with the inductive sections at the R.F. frequency of operation.

A second and related invention disclosed herein consists of a gas discharge structure for an R.F. discharge excited gas laser comprising a hollow metal tube having a first surface defining an R.F. electrode and a second surface, opposite the first, defining a ground electrode. The side walls of the tube, separating the first and second surfaces thereof, are predominantly inductive and have a high impedance at the R.F. frequency of operation, thereby decoupling the R.F. electrode from ground.

It will be appreciated that in the gas discharge structure according to the second aspect of the present invention, heat is readily and uniformly dissipated through the walls of the metal tube. However, if cooling by convection is not adequate in the particular circumstances, the ground electrode can be cooled using conventional cooling techniques and the R.F. electrode can be cooled by means of an inductively decoupled coolant carrying pipe according to the first aspect of the present invention.

Preferably, the hollow metal tube is of square or rectangular section.

Preferably, slots are formed in the side walls of the hollow metal tube to increase the inductance thereof. These slots also serve to enhance the ability of the gas discharge structure to dissipate heat in that air or gas can circulate within the structure and cool it by convection.

External capacitors may be connected in parallel with the inductive side walls of the structure in order to form a parallel resonant circuit at the R.F. frequency of operation. This serves to further increase the decoupling of the R.F. electrode from the ground electrode, facilitates impedance matching of the structure with the R.F. generator and modifies the voltage distribution along the R.F. electrode.

Embodiments of the present invention will now be described, by way of example, with reference to the accompanying drawings in which:

FIG. 1 shows a schematic view of a gas discharge structure in accordance with the first aspect of the present invention;

FIG. 2 shows a schematic modification of the cooling water pipe used in the gas discharge structure of FIG. 1;

FIG. 3 shows a schematic view of another embodiment of a gas discharge structure in accordance with the first aspect of the present invention;

Figure 4:
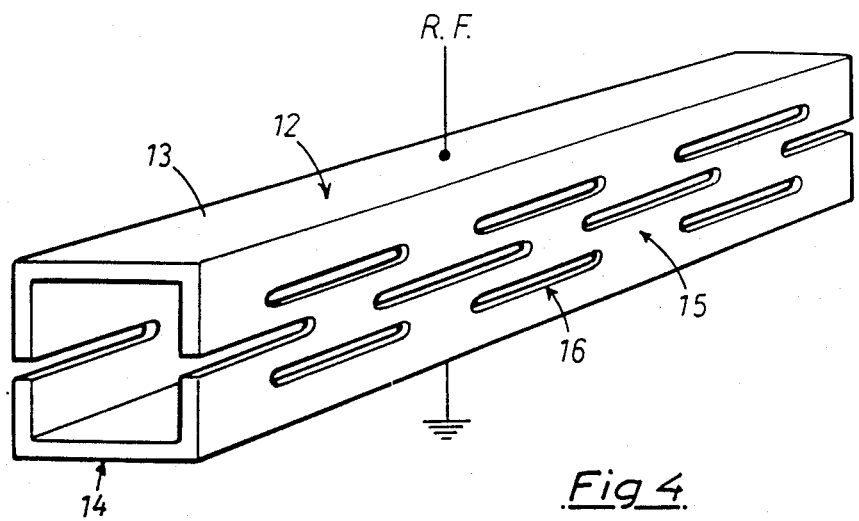
FIG. 4 shows a schematic view of a gas discharge structure in accordance with the second aspect of the present invention.

Referring to FIG. 1 of the accompanying drawings there is shown a schematic view of a capacitative gas discharge structure comprising an R.F. electrode 1 and a ground electrode 2 separated by dielectric material 3. Although not shown, the ground electrode 2 is water cooled. Thus far described the gas discharge structure is identical to the prior art gas discharge structure described in the introduction to this specification.

Clamped to the R.F. electrode 1 is an all metal pipe 4 which in use carries cooling water. The sections of the pipe 4 between the center and the ends define coils 5 before passing to ground potential at the water supply and water drain (not shown). The coils 5 form inductive elements, the values of which present a high impedance at R.F. and inductively decouple the R.F. electrode 1 from ground. Although these inductive elements are shown as being formed by coils 5 in the ends of the pipe 4, it will be readily apparent that pipe 4 of itself may have sufficient impedance to inductively decouple the R.F. electrode 1 from ground without it being necessary to include coils 5. The inductive elements of the pipe 4 may conveniently replace one or more of the external inductors which are often used in prior art devices and which are connected across the two electrodes 1, 2 to both match the impedance of the gas discharge structure to that of the R.F. generator (not shown) and to modify the voltage distribution along electrode 1.

Since the water flowing through the pipe 4 is completely enclosed by the metal envelope of the pipe 4 there is no electrical connection between the R.F. and the water flowing therein. In this respect, the R.F. is constrained to travel within a thin outer skin of the pipe 4 the thickness of which is chosen to be many times greater than the "R.F. skin depth" at the frequency of interest. This characteristic of R.F. to travel through the skin of a conductor is already well known to those skilled in the art.

Using the gas discharge structure of the first aspect of the present invention heat can be efficiently removed from the R.F. electrode without introducing losses to the overall system. Whilst water is the preferred coolant it will be readily appreciated that other coolants may equally well be used in its place.

Referring now to FIG. 2 of the accompanying drawings there is shown a partial view of an alternative embodiment of the inductive element portion of the pipe 4, usable in the gas discharge structure of FIG. 1. In this respect a capacitor 6 is connected in parallel with the inductive element at each end of the pipe 4, whether this be in the form of a coil 5 as shown or a straight section of pipe 4. The capacitor 6 significantly increases the effective impedance at each end of the pipe 4 and hence, the decoupling, and is particularly useful where the inductance of the pipe 4 is low. In addition, it also improves voltage distribution along the pipe 4 where the impedance of the pipe 4 is low. The overall impedance of the gas discharge structure may retain its original capacitative component and any modifications of this component may proceed as for a prior art gas discharge structure.

Referring now to FIG. 3 of the accompanying drawings there is shown an alternate embodiment of the first aspect of the subject invention. In this embodiment, the ground electrode is defined by an outer cylindrical tube 9. A metal water pipe feeds through the center of tube 9 and is connected thereto at its ends. In this embodiment, the R.F. signal is supplied to the center section of the pipe (at point X) through an insulated feed through (not shown). Since the R.F. signal only travels through the thin outer skin of the pipe, there is no electrical connection between the water in the pipe and the R.F. signal. In addition, the radially outer portion of the center section 7 defines the R. F. electrode.

The cylindrical tube 9 connects both ends of the pipe 8 to ground. Section 11 of the pipe between the center section 7 and the ends defines an inductive element functioning to decouple the R.F. section from ground. To enhance the decoupling effect, a capacitor 10 is connected across each section 11 of the pipe 8, the value of which is selected to form a parallel resonant circuit with the inductive section 11 of the pipe at R.F. An R.F. discharge can be formed between the R.F. electrode and any convenient earth plane.

As will be readily apparent, the metal water pipe 8 can be water cooled in much the same way as in the gas discharge structure of FIG. 1. Should the inductance of each straight end section 11 be insufficient, the inductance can be increased by putting one or more coils in the section. The outer ends of the straight pipe 11 my themselves have sufficient inductance to decouple the R.F. section from ground. However, use of coils and/or capacitor 10 is preferred so that there is an abrupt change in induction, which will provide a more stable discharge.

The ground electrode, that is to say the cylindrical tube 9 can be directly water cooled if necessary. The gas discharge structure of FIG. 3 is fabricated completely from metal and needs no dielectric to separate the R.F. electrode from the ground electrode. As such it is extremely rugged, cheap to produce and offers efficient symmetrical cooling of the gas discharge.

The structure in FIG. 3 can be used to create an annular discharge. An operating laser can be designed from an annular discharge using a multipass optical resonator system. One suitable multipass optical system is described in "Multipass Coaxial Radio Frequency Discharge $CO_2$ Laser," Xin and Hall, *Optics Communications*, Vol. 58, p. 420, No. 6, July 15, 1986.

Referring now to FIG. 4 of the accompanying drawings there is shown a schematic view of a gas discharge structure in accordance with the second aspect of the present invention. The gas discharge structure comprises a simple hollow tube 12 of square or rectangular cross-section. The upper surface 13 of the tube 12 comprises the R.F. electrode and the lower surface 14 comprises the ground electrode. The side walls 15 of the tube 12, which connect the R.F. electrode and ground electrode together, are predominantly inductive at R.F. and to this end slots 16 are cut in the side walls 15 to increase their inductance.

This gas discharge structure is particularly interesting in that it represents the inductive equivalent of the prior art capacitative structure discussed in the introduction to this specification. The impedance of the structure can be represented by a resistive component, due to the resistance of the gas discharge, in parallel with an inductive component due to the natural inductance of the structure.

The impedance is given by:

$$Z = \frac{W^2L^2R}{W^2L^2 + R^2} + j\frac{WLR^2}{W^2L^2 + R^2}$$

where W is the angular frequency of the R.F. signal, L is the natural inductance of the gas discharge structure and R is the resistance of the gas discharge. The presence of the (+j) term indicates that the structure has an inductive rather than a capacitative component to its impedance.

Gas discharge occurs within the metal tube 12. The R.F. electrode and the ground electrode are cooled symmetrically by the side walls 15. Cooling of the structure is also enhanced by the slots 16 cut in the side walls 15 which allow air or gas to circulate within the structure and cooling by convection to take place.

Figure 5:
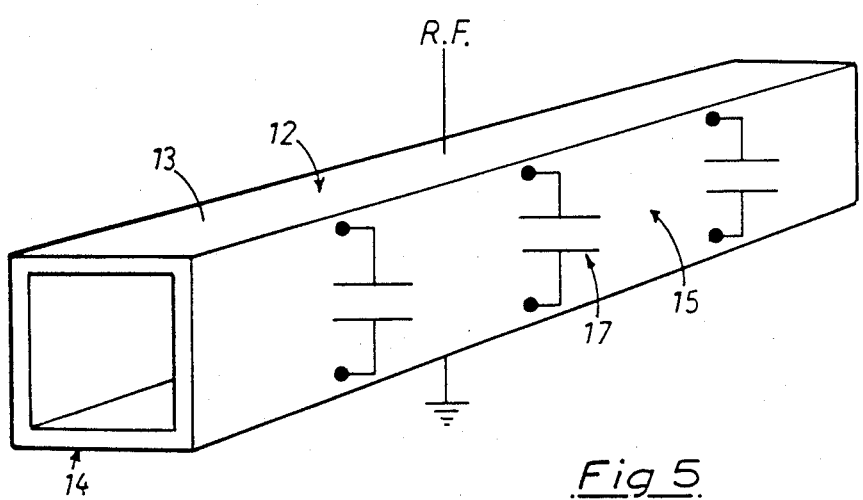
FIG. 5 shows schematic view of another embodiment of a gas discharge structure in accordance with the second aspect of the present invention.

Referring now to FIG. 5 there is shown a modified version of the gas discharge structure of FIG. 4 in which external capacitors 17 have been connected in parallel with the inductive side walls 15 of the tube 12 to modify the inductive component of the resulting impedance. This is done to further decouple the R.F. electrode from the ground electrode, to facilitate impedance matching with the R.F. generator and to locally modify the voltage distribution along the R.F. electrode. As with the external inductors of the prior art capacitative gas discharge structure these external capacitors 17 may be either localized at preferred points along the gas discharge structure or uniformly distributed.

I claim:
1. A gas discharge structure for an R.F. discharge excited gas laser comprising:
   an R.F. electrode;
   a ground electrode; and
   means for cooling said R.F. electrode, said means including a metal coolant carrying pipe the ends of which are connectable to a coolant source at ground potential, with the sections of the pipe between a center section and the ends having sufficient inductance at the R.F. frequency of operation to decouple each end from ground potential.

2. A gas discharge structure for an R. F. discharge excited gas laser as recited in claim 1 wherein said metal coolant carrying pipe has a wall thickness many times greater than the R.F. skin depth at the R.F. frequency of operation.

3. A gas discharge structure for an R.F. discharge excited gas laser according to claim 1 wherein said inductive sections of the pipe are coiled to increase the inductance thereof.

4. A gas discharge structure for an R.F. discharge excited gas laser according to claims 1 or 3 wherein a capacitor is connected in parallel with each inductive section of the pipe and is tuned to parallel resonance with the inductive section at the R.F. frequency of operation.

5. A gas discharge structure for an R.F. discharge excited gas laser according to claim 1 wherein said coolant carrying pipe is secured to the surface of the R.F. electrode, in thermal contact therewith.

6. A gas discharge structure for an R.F. discharge excited gas laser according to claim 1 wherein the radially outer portion of said center section of the coolant carrying pipe defines the R.F. electrode.

7. A gas discharge structure for an R.F. discharge excited gas laser comprising:
   a tubular outer ground electrode;
   a radially inner metal coolant carrying pipe the ends of which are connected to and supported by the ground electrode, and wherein the radially outer portion of the center section of said coolant carrying pipe defines an R.F. electrode, and with the sections of the pipe between the center section and the ends having sufficient inductance at the R.F. frequency of operation to decouple each end from ground potential.

8. A gas discharge structure for an R.F. discharge excited gas laser according to claim 7 wherein the tubular ground electrode and the metal coolant carrying pipe define an annular discharge region therebetween.

9. A gas discharge structure for an R. F. discharge excited gas laser as recited in claim 7 wherein said coolant carrying pipe has a wall thickness many times greater than the R.F. skin depth at the R.F. frequency of operation.

10. A gas discharge structure for an R.F. discharge excited gas laser according to claim 7 wherein said inductive sections of the pipe are coiled to increase the inductance thereof.

11. A gas discharge structure for an R.F. discharge excited gas laser according to claims 7 or 10 wherein a capacitor is connected in parallel with each inductive section of the pipe and is tuned to parallel resonance with he inductive section at the R.F. frequency of operation.

12. A gas discharge structure for an R.F. discharge excited gas laser according to claims 7 wherein said coolant carrying pipe is coaxially aligned within said outer tubular ground electrode.

13. A gas discharge structure for an R.F. discharge excited gas laser comprising:

a hollow metal tube having a first surface defining an R.F. electrode and a second surface, opposite the first, defining a ground electrode and wherein the side walls of the tube separating the first and second surfaces thereof are inductive and have a high impedance at the R.F. frequency of operation thereby decoupling the R.F. electrode from the ground electrode.

14. A gas discharge structure for an R.F. discharge excited gas laser according to claim 13 wherein slots are formed in the side walls of the hollow metal tube to increase the inductance thereof.

15. A gas discharge structure for an R.F. discharge excited gas laser according to claims 13 or 14 wherein external capacitors are connected in parallel with the inductive side walls of the tube in order to form a parallel resonant circuit at the R.F. frequency of operation.

16. A gas discharge structure for an R.F. discharge excited gas laser according to claim 13 wherein the hollow metal tube is of rectangular section.

* * * * *